US00RE36168E

United States Patent [19]

von der Heide et al.

[11] E Patent Number: Re. 36,168

[45] Reissued Date of Patent: Mar. 30, 1999

[54] BRUSHLESS DC DRIVE MOTOR WITH EXTERNAL ROTOR FOR USE IN DISC DRIVES AND LIKE DEVICES

[75] Inventors: Johann von der Heide, Schramberg; Rolf Müller, München; Alfred Merkle, St. Georgen, all of Germany

[73] Assignee: Papst Licensing,GmbH, Germany

[21] Appl. No.: 45,852

[22] Filed: Mar. 23, 1998

Related U.S. Patent Documents

Reissue of:

[64] Patent No.: 5,652,470
Issued: Jul. 29, 1997
Appl. No.: 460,128
Filed: Jun. 2, 1995

U.S. Applications:

[63] Continuation of Ser. No. 372,294, Jan. 13, 1995, abandoned, which is a continuation of Ser. No. 594,274, Oct. 3, 1990, Pat. No. 5,382,853, which is a continuation of Ser. No. 319,996, Mar. 7, 1989, abandoned, which is a continuation of Ser. No. 72,901, Jul. 14, 1987, abandoned, which is a continuation of Ser. No. 635,468, Jul. 27, 1984, abandoned, which is a continuation of Ser. No. 461,972, Jan. 26, 1983, abandoned, which is a continuation of Ser. No. 210,768, Nov. 26, 1980, abandoned.

[30] Foreign Application Priority Data

Jun. 6, 1980 [DE] Germany ..... 30 21 328.6

[51] Int. Cl.[6] ..... H02K 7/00; H02K 7/14

[52] U.S. Cl. ..... 310/67 R; 310/68 B; 310/156; 310/254

[58] Field of Search ..... 310/67 R, 96, 310/68 B, 172, 156, 192, 266, 91, 254; 318/254, 138, 439; 360/98.07, 99.04, 99.08

[56] References Cited

U.S. PATENT DOCUMENTS

| | | | |
|---|---|---|---|
| 3,634,873 | 1/1972 | Nishimura | 310/112 |
| 3,840,761 | 10/1974 | Muller | 310/156 |
| 3,860,843 | 1/1975 | Kawasaki et al. | 310/67 R |
| 3,873,897 | 3/1975 | Muller | 310/192 |
| 4,092,572 | 5/1978 | Murata | 318/138 |
| 4,099,104 | 7/1978 | Meller | 318/254 |
| 4,167,692 | 9/1979 | Sekiya et al. | 310/90 |
| 4,417,167 | 11/1983 | Ishii et al. | 310/67 R |
| 5,832,853 | 1/1995 | Von Der Heide et al. | 310/67 R |

FOREIGN PATENT DOCUMENTS

| | | |
|---|---|---|
| 1244283 | 7/1967 | Germany . |
| 1954409 | 6/1970 | Germany . |
| 2225442 | 12/1973 | Germany . |
| 2346380 | 11/1974 | Germany . |
| 2639055 | 3/1977 | Germany . |
| 2612464 | 8/1977 | Germany . |
| 2804787 | 9/1978 | Germany . |
| 2840057 | 3/1979 | Germany . |
| 2647675 | 4/1979 | Germany . |
| 41-015606 | 9/1966 | Japan . |
| 41-021084 | 9/1966 | Japan . |
| 52-004002 | 1/1977 | Japan . |
| 52-048009 | 4/1977 | Japan . |
| 53-055724 | 5/1978 | Japan . |
| 54-099908 | 8/1979 | Japan . |
| 54-121914 | 9/1979 | Japan . |
| 54-156106 | 12/1979 | Japan . |
| 2005482 | 4/1979 | United Kingdom . |

OTHER PUBLICATIONS

Kobayashi et al. "Direct Drive system for Isolated Loop Drive", National Technical Report, vol. 22 No. 4, Aug. 1976.
Brushless DC Disc Drive Spindle. "Sextant", Rotron, Inc., Woodstock, NY, Nov. 1980.
Zweipulsige Kollectorlose Gleichstrommotoren, Papst–Motoren KG; St Goergen/Swarzwald; Germany, Jan. 1977.

*Primary Examiner*—Clayton LaBalle
*Attorney, Agent, or Firm*—Welsh & Katz, Ltd.

[57] ABSTRACT

A brushless DC drive motor with an external rotor has three pole shoes on a substantially ring-shaped stator for each two poles on the rotor. The stator winding is commutated by a three-phase commutation network in such a fashion that first, second and third networks in the stator winding are cyclically connected to an external DC source in accordance with rotor position. Each of the networks comprises at least one stator coil wrapped around a neck of a single corresponding one of the pole shoes.

58 Claims, 8 Drawing Sheets

BRUSHLESS DC DRIVE MOTOR WITH EXTERNAL ROTOR FOR USE IN DISC DRIVES AND LIKE DEVICES

Matter enclosed in heavy brackets [ ] appears in the original patent but forms no part of this reissue specification; matter printed in italics indicates the additions made by reissue.

CROSS-REFERENCES TO RELATED APPLICATIONS

This is a continuation of application Ser. No. 08/372,294, filed Jan. 13, 1995, which is a continuation of Ser. No. 07/594,274, filed Oct. 3, 1990, now U.S. Pat. No. 5,382,853, which is a continuation of Ser. No. 07/319,996, filed Mar. 7, 1989, abandoned, which is a continuation of Ser. No. 07/072,901, filed Jul. 14, 1987, abandoned, which is a continuation of Ser. No. 06/635,468, filed Jul. 27, 1984, now abandoned, which is a continuation of Ser. No. 06/461,972, filed Jan. 26, 1983, abandoned, which is a continuation of Ser. No. 06/210,768, filed Nov. 26, 1980, now abandoned.

The invention of U.S. Ser. No. 06/060,879, now U.S. Pat. No. 4,429,263, could be applied advantageously in connection with this present application and therefore is requested to be dealt with as part of it in combination. The benefit of such a combinatory use would result in a reduction of the magnetic stay-field flux upon neighborhood heads.

BACKGROUND OF THE INVENTION

1. Field of the Invention

This invention pertains to drive motors such as are used in disc drives and like devices such as, for example, axial flow cooling fans. More particularly, this invention concerns those drive motors which operate off DC sources and have external rotors which can support a load member such as, for example, one or more discs in a disc drive or a fan wheel having a number of fan blades.

2. Description of the Prior Art

A prior-art device of this type is now commercially available, and is denominated a "Sextant Brushless DC Disk, Drive Spindle", and is available from Rotron Inc, as Model 4700. This device has a rotor with four poles and a stator comprising a multiplicity of overlapping coils.

This known device has certain disadvantage. From a physical standpoint, constructing the stator and the stator winding is a complicated matter. Since the individual coils of the stator winding overlap each other at the axial faces of the stator, the coil ends are long and bulky. Deep slots in the stator are necessary in order to allow overlapping of the individual stator coils. As a result, when it is necessary to fill the grooves with copper, a difficult task is presented The space factor will be undesirably low. Furthermore, there is not much room available in the center of the stator into which a journal for the rotor may be introduced.

From an electrical standpoint, other disadvantages exist The total resistance of the stator winding is relatively large, and at high drive motor voltages the overlapping between the individual stator coils can cause isolation problems to exist. Additionally, the motor constant $$k_M = \frac{k_E^2}{R}$$

(where $k_E$ is the ratio of voltage induced in the stator winding to the angular frequency of the rotor and R is the total resistance of the stator winding) is low, by virtue of the high R. Therefore, the prior-art device has a relatively low efficiency.

It would be advantageous to provide a drive motor of this type which would be easier to construct and which would have less bulky coil ends, in addition to a low resistance and a correspondingly higher efficiency. It would further be advantageous to provide a drive motor of this type in which interference problems caused by overlapping stator coils would not exist and which would allow to use a robust bearing system.

The invention of U.S. Ser. No. 06/060,879 could be applied advantageously in connection with this present invention and therefore is requested to be dealt with as part of it in combination. The benefit of such a combinatory use would result in a reduction of the magnetic stray-field flux upon neighbored heads.

SUMMARY OF THE INVENTION

These objects, along with others which will appear hereinafter, are achieved in this invention. In this invention, the stator winding includes a plurality of stator coils which are each wound around a single pole shoe of a first plurality of pole shoes of the stator and which form a first network, a second network and a third network. The stator is substantially ring-shaped. The pole shoes of the stator are generally T-shaped and are distributed at a regular pole pitch about a center axis. The pole shoes are separated from each other by a first plurality of gaps. The gaps are located between adjacent ends of adjacent pole shoes and are narrow in relation to the circumferential extension of each of the pole shoes. The rotor supports an annular permanent magnetic structure which has a second plurality of poles which alternate circumferentially in sense around the magnetic structure itself. The second plurality is so chosen that a fraction in which the first plurality is a numerator and the second plurality is a denominator will have a value of 1.5. Furthermore, three-phase brushless commutation means is connected to the first, second and third networks and connects them to an external DC source in accordance with rotor position.

Inasmuch as there is no overlap between the stator coils in either a physical or an electrical sense, no interference problems are presented. Additionally, the stator itself may be manufactured in an axially compact fashion by avoiding bulky stator coils and easily permitting slots between the stator poles to be filled with copper. Because the structure of the invention is compact, stator winding resistance is kept to a minimum and the efficiency of the invention is better than the efficiency known from the prior art.

A further advantage of the invention resides in so designing the stator that a relatively large central circular cavity is available into which a robust and very precise bearing journal may be introduced. This permits a mechanically stable pivotal connection between the rotor and the stator.

If desired, the pole shoes may be manufactured in an asymmetric shape in order to generate a reluctance torque during operation of the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF PREFERRED EMBODIMENTS

Figure 1:
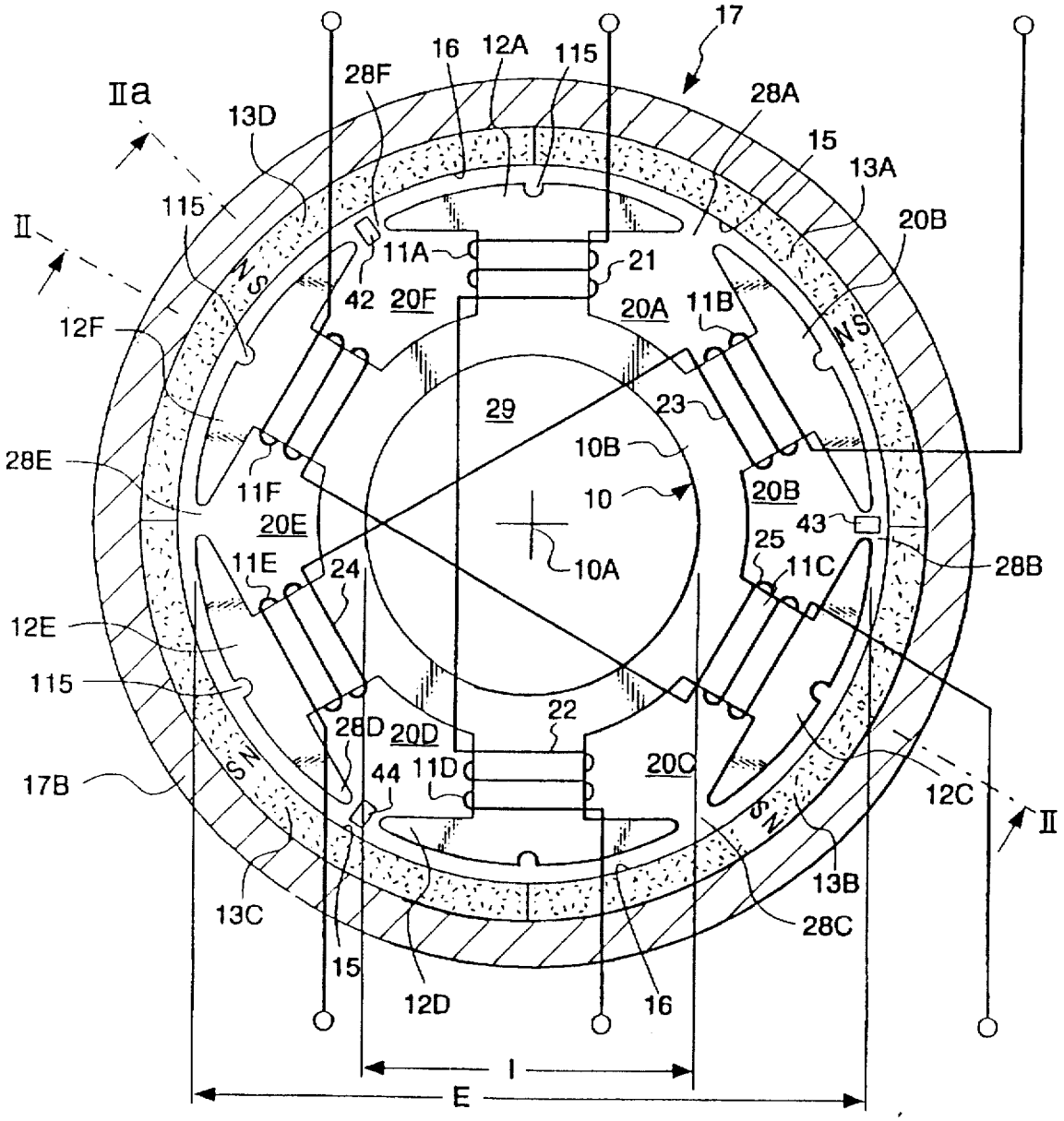
FIG. 1 shows a top view of a first embodiment of the invention in which the top of the rotor has been cut away.
Figure 1A:
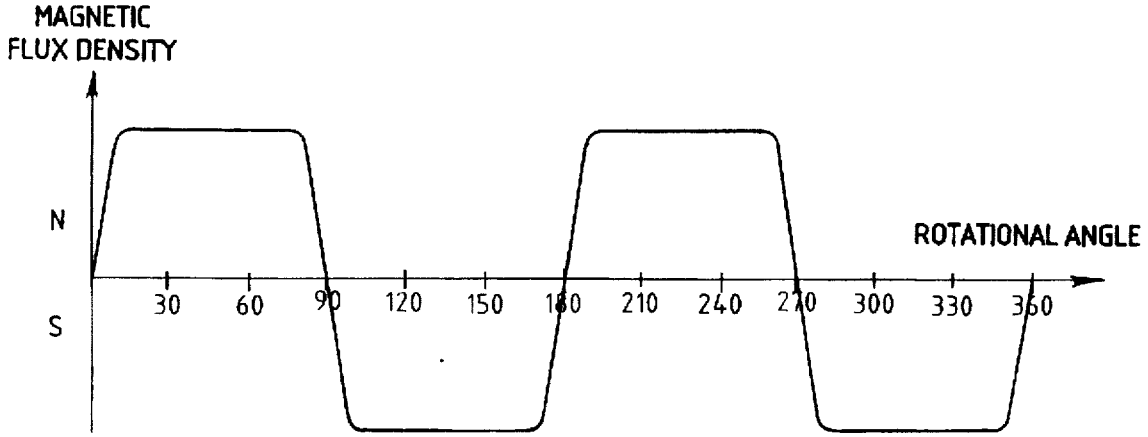
FIG. 1A shows that the magnetization of the magnet sections 13A–13D of FIG. 1 varies in a substantially trapezoidal or rectangular manner in a circumferential direction.

A fixed magnetic stator 10 is radially symmetrical about a center axis 10A. Stator 10 has an annular central region 10B, which surrounds a central cylindrical cavity 29. Six like generally T-shaped pole shoes 12A–12F extend radially outwardly from central region 10B at a regular pole pitch around the periphery of central region 10B, so that each two adjacent pole shoes such as 12A and 12B are displaced 60° from each other. The outermost edges of pole shoes 12A–12F can either be purely circular arcs or can (as shown in this embodiment) have notches 115, which notches 115 may be used to accommodate wires for purposes described below.

Stator 10 is manufactured in a laminar fashion from a stack of like metal plates which are relatively thin. Slots 20A–20F are defined as shown between each two adjacent pole shoes, so that, e.g., slot 20A is located intermediate pole shoes 12A and 12B. Slots 20A–20F permit the stator winding described immediately below to be wound around stator 10.

The stator winding is formed from stator coils 21–26. Stator coil 21 is wound around the neck 11A of pole shoe 12A beneath the T-shaped head thereof, and stator coil 22 is likewise wound around the neck 11D of pole shoe 12D. As is evident from FIG. 1, pole shoe 12A is diametrically opposed to pole shoe 12D, so that stator coil 21 and stator coil 22 are likewise diametrically opposed. Stator coil 21 is connected in series with stator coil 22 in order to define a first network in the stator winding.

In a similar fashion, stator coil 23 and stator coil 24 are wound around diametrically opposed necks 11B and 11E of pole shoes 12B and 12E, forming a second network in the stator winding. In exactly the same fashion, a third network is formed from diametrically opposed stator coils 25 and 26, which are wound around pole shoes 12C and 12F respectively.

Before proceeding further in this description of the preferred embodiments of the invention, it is appropriate to note that FIG. 1 is schematic in nature. Although stator coil 21 is shown to be connected to stator coil 22 by means of a wire extending across central cavity 29, it will be understood that this connection as shown is not accurate in the physical sense. As will become apparent immediately below, central cavity 29 is filled with a bearing journal 32–34 which prevents the electrical connections shown from taking place along the physical lines indicated in FIG. 1.

Figure 2:
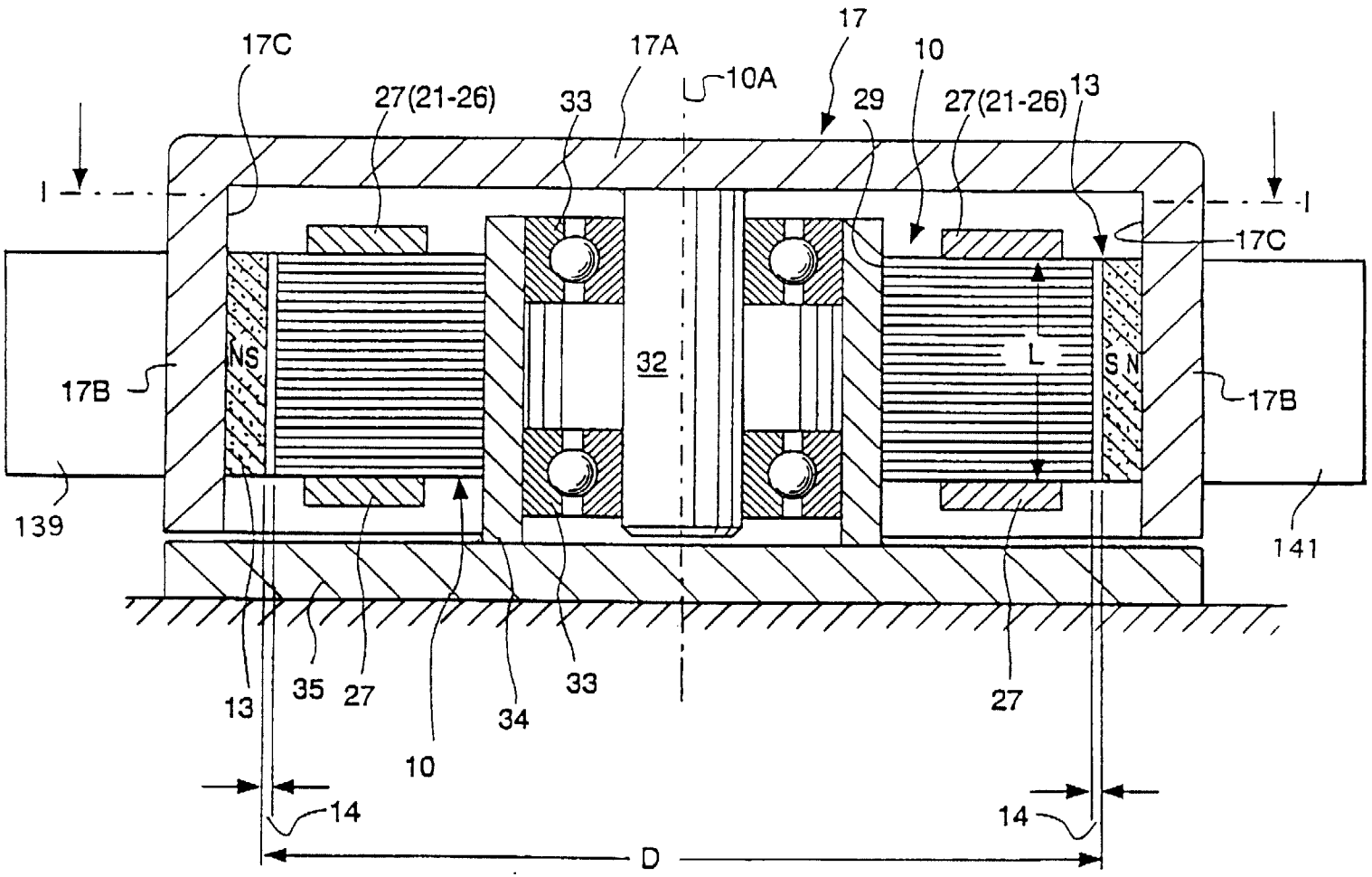
FIG. 2 shows a side elevational view of the embodiment shown in FIG. 1.
Figure 2A:
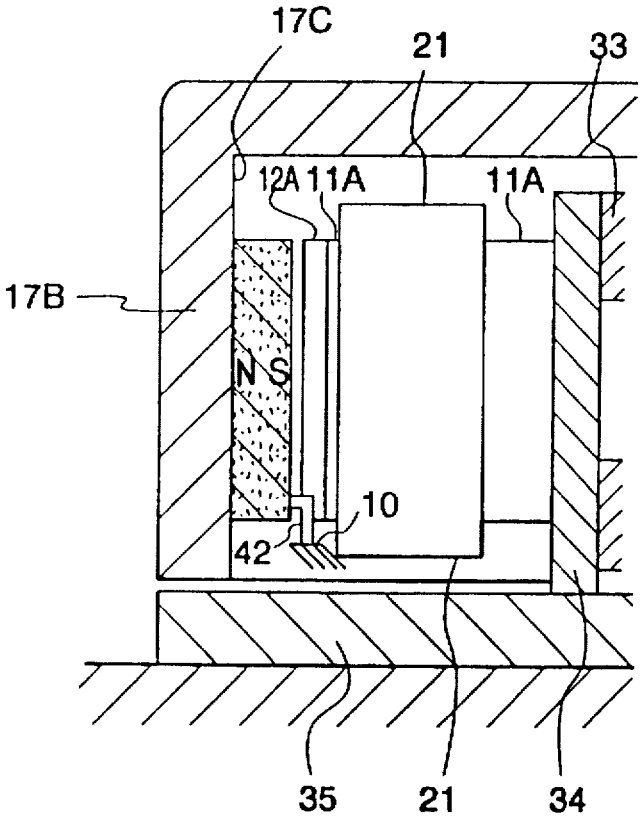

As can be seen in FIG. 2, stator 10 is mounted on cylindrical sleeve 34 which occupies central cavity 29.

Sleeve 34 is supported by horizontal base plate 35. Additionally, sleeve 34 contains ball bearing journals 33, shown in FIG. 2 as being horizontally oriented.

A magnetic external rotor comprises an inverted cup-shaped rotor housing 17 with a horizontal top surface 17A and a cylindrical circumferential wall 17B. Stub shaft 32 is attached to the center of rotor housing 17 at the center of top 17A. Stub shaft 32 rides in ball bearing journals 33 and is supported thereby in a manner that rotor housing 17 is pivotally secured to stator 10 and can rotate about center axis 10A. As can be further seen in FIG. 2, circumferential wall 17B has an inner circumferential surface 17c which encircles stator 10 and stator coils 21–26. A load member comprising a fan wheel having a number of fan blades can be supported on circumferential wall 17B of rotor housing 17 for rotation about axis 10A. FIG. 2 shows two fan blades 139 and 141 which are directly attached to wall 17B.

Annular and radially magnetized permanent magnetic structure 13 is affixed to inner circumferential surface 17C of rotor housing 17. Magnetic structure 13 may be constructed in a unitary fashion, or may be constructed of a plurality of like arcuate magnet segments. The former construction is shown in FIG. 1. As can be seen there magnetic structure 13 comprises four arcuate sections 13A–13D which are radially magnetized such that the inner circumferential surfaces of adjacent sections 13A–13D are of opposite polarities, wherein the magnetization varies in circumferential direction in a substantially rectangular or trapezoidal manner. Thus section 13A is radially magnetized so that its north pole 15 is radially inwardly. Magnet section 13B is radially magnetized so that its south pole 16 is radially inwardly. This alternation of the senses of magnetization is continued in magnet section 13C, which has its north pole 15 facing radially inwardly and in magnet section 13D which has its south pole 16 facing radially inwardly.

In the embodiment shown in FIG. 1, magnet sections 13A–13D each subtend 90° of arc and form four poles.

As the first, second and third networks in the stator winding are commutated in a fashion described below, magnetic forces acting between pole shoes 12A–12F will act on magnetic structure 13 and cause rotor housing 17 to rotate. It will be appreciated that it is not necessary for the practice of this invention for there to be exactly six pole shoes 12A–12F, nor that there be exactly four magnet sections 13A–13D. Thus, e.g., a useful drive motor will be obtained by providing a magnetic rotor structure having two poles, i.e. two oppositely radially magnetized magnet sections, and stator having three pole shoes each carrying one of the first, second and third networks. However, it will be noted that there are three pole shoes for each two poles in magnet structure 13. Thus, a first fraction in which the number of pole shoes is the numerator and in which the number of poles is the denominator will always have a value of 1.5.

Suitable materials for magnetic structure 13 or magnet segments corresponding to magnet sections 13A–13D include: magnetic material in a synthetic binder, a "rubber magnet" formed from a mixture of hard ferrite and an elastomeric material; ceramic magnetic material; and a compound containing samarium and cobalt. The unitary annular structure formed of "rubber magnet" such as described above is particularly advantageous.

In the embodiment shown in FIG. 1, each magnet section 13A–13D subtends 90° of arc and has a breadth corresponding to the pole pitch of the rotor.

It will be appreciated by those skilled in the art that it is necessary to provide a rotor position detector responsive to rotor position in order to cause commutation of the stator winding to take place at appropriate times. A suitable rotor position detector will include three sensors such as bistable Hall generators that are fixed on stator 10. In the embodiment shown in FIG. 1, bistable Hall generators are not shown, but they are indicated by reference numerals 42–44 in FIG. 3. Other rotor position detectors such as optical devices, field plates, and magnetic diodes may be used. When pole breadth substantially corresponds to the pole pitch of the rotor, the magnetic structure 13 may be used to actuate magnetic field sensors. I.e., in such an embodiment a separate control magnetic structure is not required to operate the magnetic field sensors. Advantageously, pole breadths will be set to correspond to not less than 67 percent of pole pitch and not more than 100 percent of pole pitch of the rotor. It is desirable to prevent pole breadth from decreasing below 67 percent of rotor pole pitch in order to ensure that the drive motor operates with sufficient power.

Figure 3:
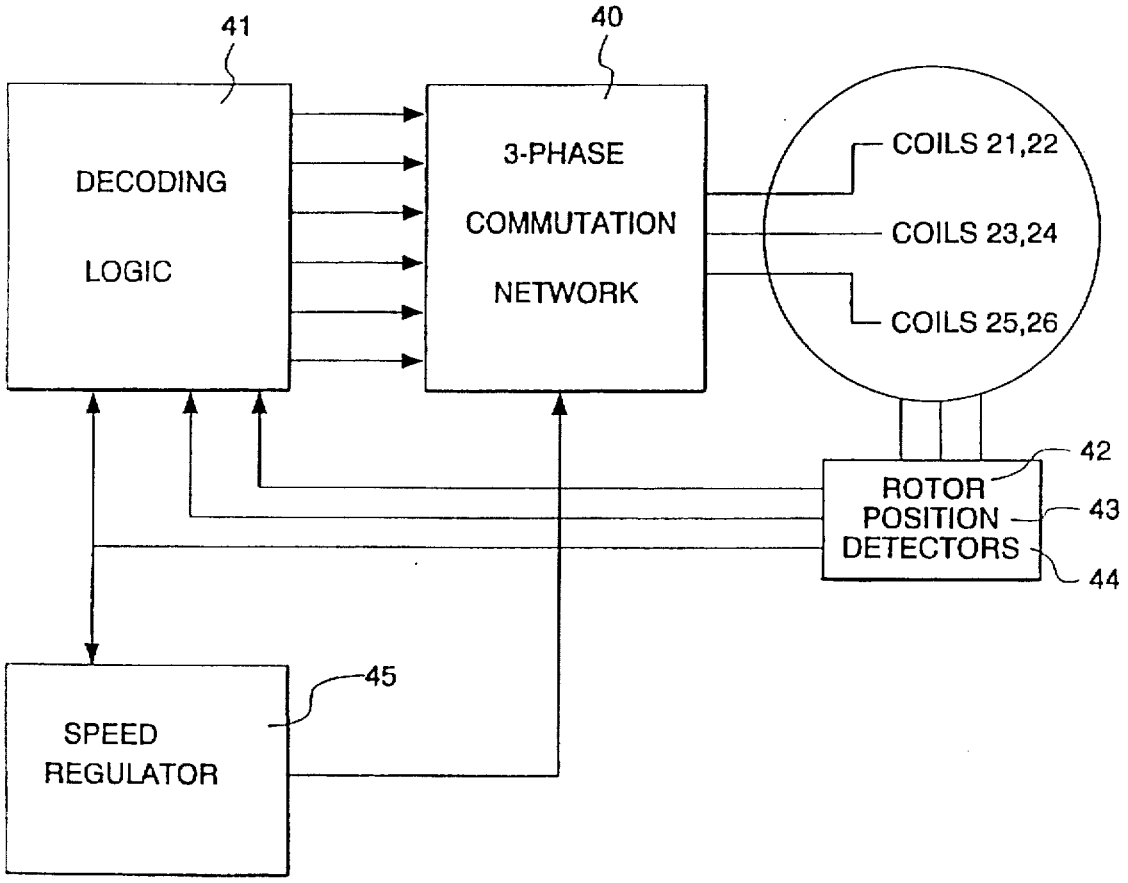
FIG. 3 shows a block diagram of control circuitry which drives the invention.

In the embodiment of the invention shown in FIGS. 1–3, commutation of the stator winding takes place by operation of three-phase commutation network 40. Commutation network 40 is driven by decoding logic 41, which latter is, in turn, driven by field sensors 42–44 installed in stator 10 to sense the position of rotor 17. Speed regulator 45 is connected to one of field sensors 42–44, to decoding logic 41, and to commutation network 40, in order to permit the drive motor to be operated accurately at a predetermined speed.

German Offenlegungsschrift 28 04 787 as well as U.S. Pat. No. 4,099,104 the disclosure of which is incorporated herein teach the use of early commutation in DC motors of this type. This principle can be applied to this invention by locating field sensors 42–44 not in the centers of pole shoes 12A–12F, but rather displaced from such centers in the counter-direction of rotation of rotor 17. This technique finds application to compensate for the effects of inductance in the stator winding which occurs as current flow through stator coils 21–26 increases.

Gaps 28A–28F are located between adjacent ends of adjacent pole shoes 12A–12F. For example, gap 28A is located between adjacent ends of pole shoes 12A and 12B. Gaps 28A–28F are narrow in relation to the circumferential extension (breadth) of each of the pole shoes. Advantageously, gaps 28A–28F are so dimensioned that each gap 28A–28F corresponds to between 2 percent and 20 percent of the circumferential extension of each of pole shoes 12A–12F.

The invention is so constructed that both spatial and electrical advantages are gained by properly dimensioning certain components. In particular, referring to FIG. 2, it can be seen that a cylindrical air gap 14 separates magnetic structure 13 inside rotor 17 from laminated stator stack 10. Stator stack 10 has a thickness L which is measured axially from the axial faces of stator stack 10. Coil ends 27 extending axially beyond stator stack 10 are formed by stator coils 21–26. Although FIG. 2 is not shown to scale, it will be appreciated that the height of stator coil ends 27 will directly affect the total axial dimension of the drive motor, especially in motors which utilize a thin stator 10. In the motor of the invention overlapping of stator coils 21–26 is avoided thereby minimizing the axial dimension of coil ends 27.

Magnetic structure 13 is thus separated from stator 10 by an air gap having a maximum diameter D. The invention is so dimensioned that a second fraction having L as a numerator and D as a denominator will have a value at most equal to one—i.e., the ratio L/D is less than or equal to one. Similarly, central cavity 29 has an interior diameter I, and stator 10 further has an exterior diameter E. Stator 10 is so constructed that a third fraction having I as a numerator and E as a denominator will have a value at least equal to 0.35, i.e., I/E is greater than or equal to 0.35. Preferably I/E is between 0.4 and 0.7.

Figure 4:
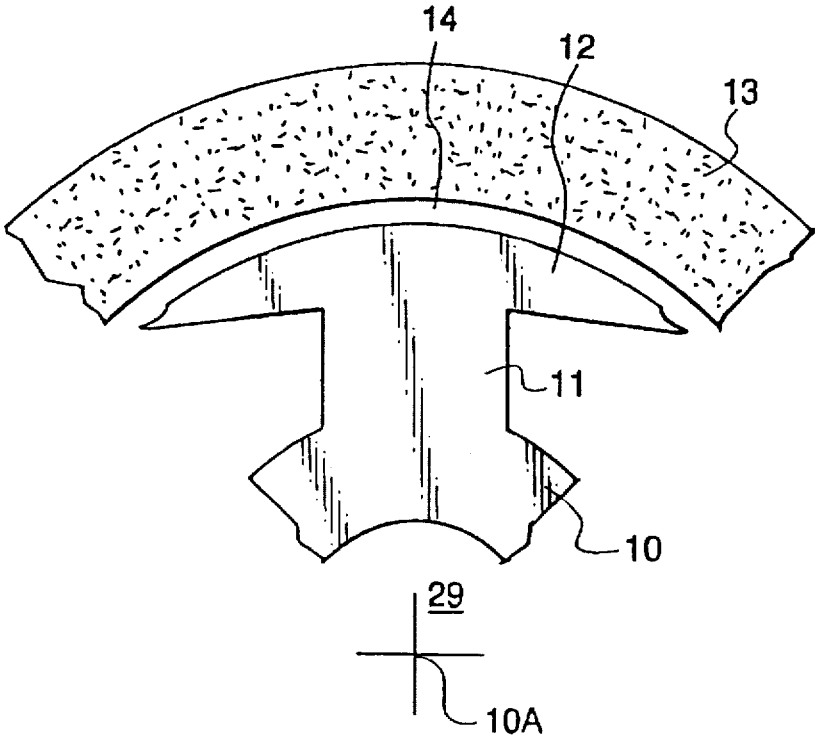
FIG. 4 shows a detail view of a second embodiment of the invention.

Several advantages accrue from these dimensions. Overall resistance of the stator winding is held to a minimum and a large space is available for journalling the rotor in a stable and robust fashion As an alternate embodiment, pole shoes 12A–12F can be manufactured asymmetrically, as is shown in FIG. 4, and as is more particularly described and explained in German Patent No. 23 46 380 as well as in U.S. Pat. No. 3,873,897 and in U.S. patent application Ser. No. 06/060/879 (Rolf M üller), the disclosure of which is incorporated herein. The pole shoe 12 is so shaped that when starting from a gap and continuing in a circumferential direction, air gap 14 reaches a maximum thickness in approximately 10° of arc. Thereafter, air gap 14 decreases in thickness during the following 60°–70° of arc until a minimum is reached, and thereafter increases until the original thickness is reached at the next gap. By virtue of this construction, a torque of reluctance is generated, which complements the torque which is generated by the motor windings. While such an embodiment is not required in a three-phase DC motor such as the one disclosed herein, it may be useful in other contexts, such as a six-pole, double-impulse, single-phase DC motor. (The term "double-impulse motor" as used herein has the meaning of "zweipulsiger Motor" as the latter term is used in a certain publication.

"Lweipulsige kollektorlose Gleichstrommotoren". Dr.-Ing. Rolf Müller ASR-Digest für Angewandte Antriebstechnik, Vol. 1–2/1977.

If desired, small central notches 115 may be located centrally in the outer periphery of each pole shoe 12A–12F. In case of a three-phase motor this permits a winding (not shown) for a tachogenerator to be placed into such notches 115 so as to enable the third harmonic of the voltage induced in the stator winding to be taken off from the winding in notches 115 as an output.

The low resistance of the stator winding not only allows a higher efficiency to be achieved, but also correspondingly increases magnetic field strength, thereby increasing efficiency. The simple construction of stator 10 permits the invention to be manufactured more inexpensively, and the dimensions of the invention are so chosen that journalling of rotor 17 is stable and robust and overall size of the invention is still held to a minimum. Interference caused by physical overlapping between stator coils 21–26 is eliminated, thereby eliminating a possible source of interference problems.

Figure 5:
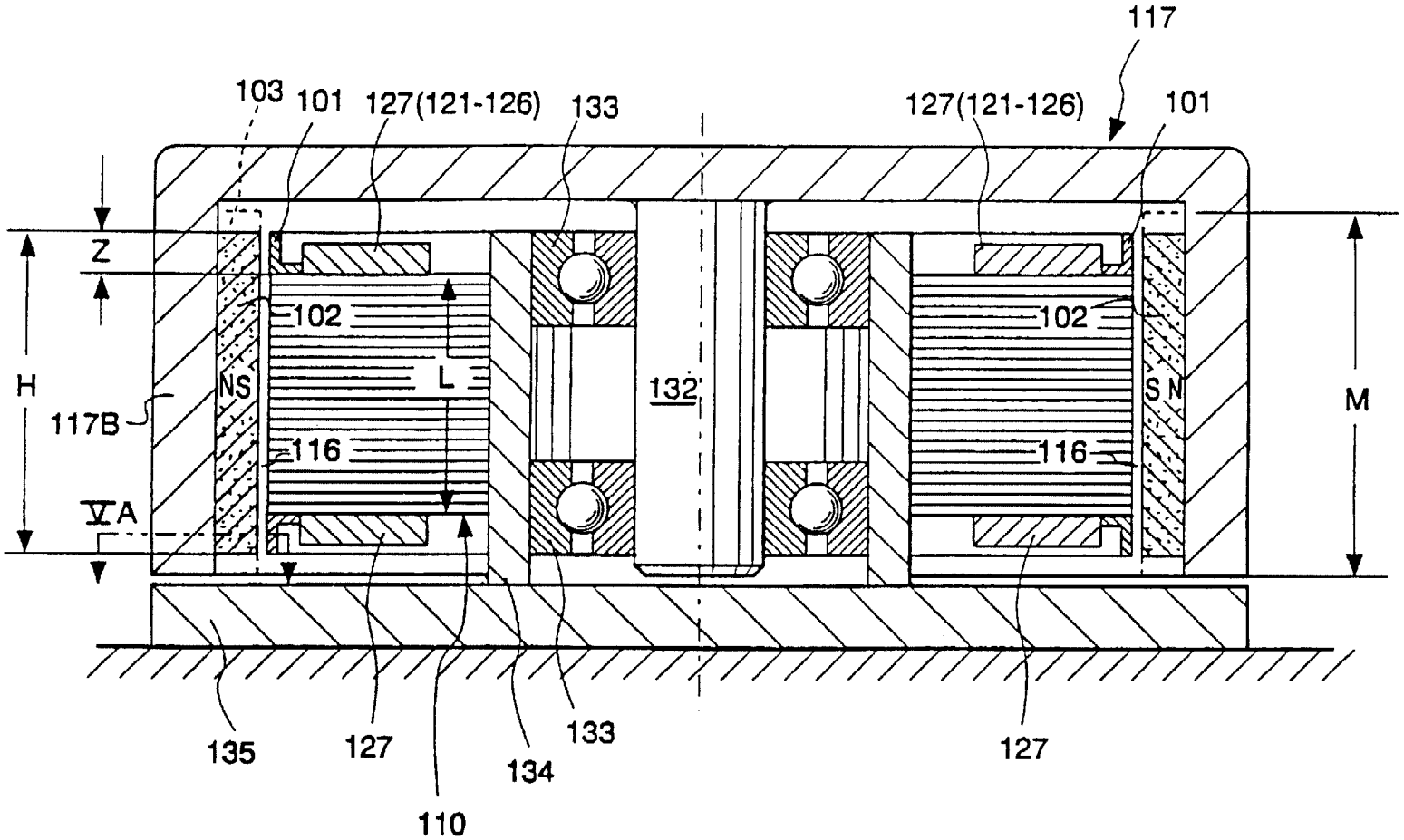
FIG. 5 shows a side elevational view similar to FIG. 2 of a further embodiment of the invention.
Figure 5A:
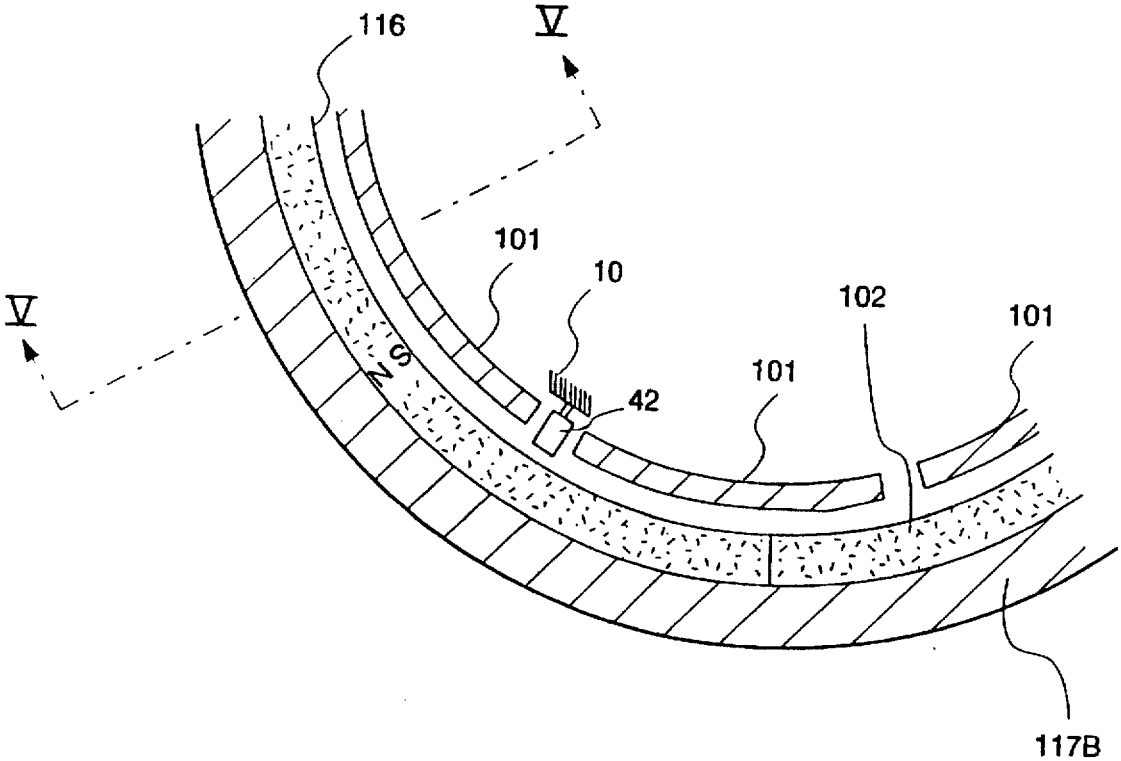

In the embodiment of the invention shown in FIG. 5 members corresponding to those shown in FIG. 2 are provided with corresponding reference numerals in the one hundred series. Different from the embodiment of FIG. 5, flux guide members 101 are attached to both axial end faces of the heads of pole shoes 112A–112F. Flux guide members 101 are L-shaped in cross section, the circumferential extension of each flux guide member 101 corresponds to that of the corresponding pole shoes 112A–112F. Flux guide members 101 are dimensioned so that the axial extensions Z thereof substantially correspond to that of the coil ends 127 of stator coils 121–126.

The magnetic structure 113 has an enlarged axial dimension when compared with that of the embodiment of FIG. 2. Thus, as indicated in FIG. 5 at 102, the axial dimension H of magnet structure 113 is at least equal to L+2Z. As illustrated in FIG. 5 by phantom lines at 103, the axial dimension of the magnetic structure 113 preferably may be increased to correspond substantially to the axial length of circumferential surface 117C of rotor housing 117 (dimension M in FIG. 5).

Flux guide members 101 function to pick up additional magnetic flux from magnet structure 113 and to guide such additional flux into the laminated stator stack 110. Accordingly, the axial space required to receive the coil ends 127 is utilized by the provision of flux guide members 101 and the axially extended magnetic structure 113 to direct the magnetic flux from the magnetic structure 113 of the rotor into the laminated stator stack 110.

The embodiment of FIG. 5 is of particular importance when the magnetic structure 113 is made of a mixture of magnetic material and an elastomeric binder, such as plastic material or rubber, because such a magnetic structure on the one hand is particularly inexpensive, but on the other hand results in the production of a magnetic field density lower than that obtained by use of a magnetic structure made of ceramic material.

The embodiment of FIG. 5 is of advantage in that, when compared with the embodiment of FIG. 2, a further reduction of the axial dimensions of the drive motor is possible while providing for the same motor output. On the other hand an increased motor output may be obtained when providing for the same axial motor dimension as in the embodiment of FIG. 2.

In the embodiment of FIG. 5, magnetic sensors 42, 43, 44 preferably are positioned in circumferential gaps between adjacent flux guide members 101.

Whereas pairs of stator coils 21, 22; 23, 24; and 25, 26 each are connected in series, it is also possible to connect coils 21 and 22, coils 23 and 24 as well as coils 25 and 26 of the first, second and third networks, respectively, in parallel. The first, second and third networks may be delta-connected, Y-connected or star-connected. Furthermore, each of coils 21–26 or 121–126 may be bifilarly wound.

It will be understood that each of the elements described above, or two or, more together, may also find a useful application in other types of constructions differing from the types described above.

While the invention has been illustrated and described as embodied in a brushless dc drive motor with external rotor for use in disc drives and like devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention

What is claimed as new and desired to be protected by Letters Patent is set forth in the appended claims:

1. A brushless DC motor having a total number of phases divisible by three for use in applications other than an information storage device, said motor comprising:

a stator including a generally ring-shaped stator core having at least six radially extending pole shoes generally uniformly distributed about a central axis wherein a stator slot is defined between each pole shoe, said stator further including a stator winding having a number of physically non-overlapping stator coils disposed on said pole shoes in at least three evenly radially distributed sets wherein one non-overlapping stator coil is wound around each of said pole shoes;

a rotor having a circular cylindrical surface upon which a continuous ring of generally radially oriented permanent magnetic material is mounted, said ring being magnetized to form at least four radially magnetized permanent magnets of alternating polarity wherein a circular cylindrical air gap is defined between adjacent surfaces of said pole shoes and said ring of permanent magnets, a pole gap is defined between the magnetic poles in each of said permanent magnets such that the circumferential extent of each pole gap is small compared to the circumferential extent of the magnetic poles in the pair of permanent magnets adjacent thereto, the radial magnetization of said permanent magnets varies in a substantially trapezoidal manner in a circumferential direction, and the number of said stator coils divided by the number of said permanent magnets is equal to 3/2;

a load member other than a moveable storage medium, said load member being operatively engaged with said rotor; and a control circuit electrically connected to said stator winding and mounted stationary with respect to said stator, said sets of stator coils being selectively energized by said control circuit to operatively interact with said permanent magnets, rotate said stator about said central axis and move said load member, all of the coils in each of said sets of stator coils when energized being energized substantially simultaneously with substantially identical magnetic polarity.

2. The brushless DC motor of claim 1 wherein said stator core comprises a stack of laminated plates of magnetically conductive material.

3. The brushless DC motor of claim 1 wherein said stator winding is a three-phase winding with each of said stator coils being a monofilar coil.

4. The brushless DC motor of claim 1 wherein the permanent magnets in said ring comprise circumferentially consecutive portions of a bent strip of a permanently magnetized material.

5. The brushless DC motor of claim 1 wherein said permanent magnetic material comprises a material selected from the group consisting of: magnetic material in a synthetic binder, a mixture of hard ferrite and an elastomeric material, ceramic magnetic material, and a compound containing samarium and cobalt.

6. The brushless DC motor of claim 1 wherein the magnetic pole in each of said permanent magnets has a circumferential extent corresponding to at least 67 percent and at most 100 percent of the circumferential extent of the corresponding permanent magnet.

7. The brushless DC motor of claim 1 wherein said stator core has an axial length L and said cylindrical air gap has a diameter D, wherein L is at most equal to D.

8. The brushless DC motor of claim 1 wherein said rotor comprises an external rotor and wherein said startor core has an external diameter E and includes a central axis circular cavity having an internal diameter of I, wherein I is at least equal to 35 percent of E.

9. The brushless DC motor of claim 8 wherein I is equal to between 40 and 70 percent of E.

10. The brushless DC motor of claim 1 wherein each of said pole shoes is generally T-shaped and comprises a first radial part of relatively narrow circumferential extent and a second radial part of relatively larger circumferential extent, the second radial parts of adjacent pole shoes being circumferentially spaced from each other by an intermediate gap, the circumferential extent of each of said intermediate gaps being small compared to the circumferential extent of each of said second radial parts.

11. The brushless DC motor of claim 10 wherein each of said second radial parts varies proceeding in the circumferential direction to generate a reluctance torque, during operation of said brushless DC motor.

12. The brushless DC motor of claim 10 wherein each of said intermediate gaps has a circumferential extent corresponding to between two percent axed twenty percent of the circumferential extent of each of said second radial parts.

13. The brushless DC motor of claim 1 further comprising at least three magnetic field sensors mounted stationary with respect to said startor which are at least partially disposed within the magnetic field emitted by said ring of permanent magnets, said control circuit being electrically connected to said magnetic field sensors.

14. The brushless DC motor of claim 13 wherein each of said magnetic field sensors comprises a Hall generator.

15. The brushless DC motor of claim 1 wherein each of said sets of startor coils comprises at least one diametrically opposed pair of stator coils.

16. The brushless DC motor of claim 15 wherein the stator coils in each of said diametrically opposed pairs are electrically connected together in series.

17. The brushless DC motor of claim 15 wherein said stator core comprises a stack of laminated plates of magnetically conductive material.

18. The brushless DC motor of claim 15 wherein said stator winding is a three-phase winding with each of said stator coils being a monofilar coil.

19. The brushless DC motor of claim 15 wherein the permanent magnets in said ring comprise circumferentially consecutive portions of a bent strip of a permanently magnetized material.

20. The brushless DC motor of claim 15 wherein said permanent magnetic material comprises a material selected from the group consisting of magnetic material in a synthetic binder, a mixture of hard ferrite and an elastomeric material, ceramic magnetic material, and a compound containing samarium and cobalt.

21. The brushless DC motor of claim 15 further comprising at least three magnetic field sensors mounted stationary with respect to said stator which are at least partially disposed within the magnetic field emitted by said ring of permanent magnets, said control circuit being electrically connected to said magnetic field sensors.

22. The brushless DC motor of claim 21 wherein each of said magnetic field sensors comprises a Hall generator.

23. The brushless DC motor of claim 15 wherein the magnetic pole in each of said permanent magnets has a circumferential extent corresponding to at least 67 percent and at most 100 percent of the circumferential extent of the corresponding permanent magnet.

24. The brushless DC motor of claim 15 wherein said stator core has an axial length $L$ and said cylindrical air gap has a diameter D, wherein L is at most equal to D.

25. The brushless DC motor of claim 15 wherein said rotor comprises an external rotor and wherein said stator core has an external diameter E and includes a central axis circular cavity having an internal diameter of I, wherein I is at least equal to 35 percent of E.

26. The brushless DC motor of claim 25 wherein I is equal to between 40 and 70 percent of E.

27. The brushless DC motor of claim 10 wherein said stator core further comprises flux guide structures which extend out in axial direction from both axial ends of the second radial parts of said pole shoes.

28. The brushless DC motor of claim 27 wherein the circumferential extents of said flux guide structures substantially correspond to the circumferential extents of the second radial parts of said pole shoes.

29. The brushless DC motor of claim 27 wherein the axial extension of said flux guide structures substantially corresponds to that of the coil ends of said stator coils.

[30. A brushless DC motor having a total number of phases divisible by three for use in applications other than an information storage device, said motor comprising:

a stator including a generally ring-shaped stator core having at least six radially extending pole shoes generally uniformly distributed about a central axis wherein a stator slot is defined between each pole shoe, said stator further including a stator winding having a number of physically non-overlapping stator coils disposed on said pole shoes in at least three evenly radially distributed sets wherein one non-overlapping stator coil is wound around each of said pole shoes;

a rotor having a circular cylindrical surface upon which a continuous ring of generally radially oriented permanent magnetic material is mounted, said ring being magnetized to form at least four radially magnetized permanent magnets of alternating polarity wherein a circular cylindrical air gap is defined between adjacent surfaces of said pole shoes and said ring of permanent magnets, a pole gap is defined between the magnetic poles in each of said permanent magnets such that the circumferential extent of each pole gap is small compared to the circumferential extent of the magnetic poles in the permanent magnets adjacent thereto, the radial magnetization of said permanent magnetic varies in a substantially trapezoidal manner in a circumferential direction, and the number of said stator coils divided by the number of said permanent magnets is equal to 3/2;

a load member other than a moveable storage medium, said load member being operatively engaged with said rotor; and a control circuit electrically connected to said stator winding and including at least three magnetic field sensors mounted stationary with respect to said stator which are at least partially disposed within the magnetic field emitted by said ring of permanent magnets, said sets of stator coils being selectively energized by said control circuit to operatively interact with said ring of permanent magnets, rotate said rotor about said central axis and move said load member, all of the coils in each of said sets of stator coils when energized being energized substantially simultaneously with substantially identical magnetic polarity.]

[31. The brushless DC motor of claim 30 wherein said stator core comprises a stack of laminated plates of magnetically conductive material.]

[32. The brushless DC motor of claim 30 wherein said stator winding is a three-phase winding with each of said stator coils being a monofilar coil.]

[33. The brushless DC motor of claim 30 wherein the permanent magnets in said ring comprise circumferentially consecutive portions of a bent strip of a permanently magnetized material.]

[34. The brushless DC motor of claim 30 wherein said permanent magnetic material comprises a material selected from the group consisting of: magnetic material in a synthetic binder, a mixture of hard ferrite and an elastomeric material, ceramic magnetic material, and a compound containing samarium and cobalt.]

[35. The brushless DC motor of claim 30 wherein the magnetic pole in each of said permanent magnets has a circumferential extent corresponding to at least 67 percent and at most 100 percent of the circumferential extent of the corresponding permanent magnet.]

[36. The brushless DC motor of claim 30 wherein said stator core has an axial length L and said cylindrical air gap has a diameter D, wherein L is at most equal to D.]

[37. The brushless DC motor of claim 30 wherein said rotor comprises an external rotor and wherein said stator core has an external diameter E and includes a central axis circular cavity having an internal diameter of I, wherein I is at least equal to 35 percent of E.]

[38. The brushless DC motor of claim 37 wherein is equal to between 40 and 70 percent of E.]

[39. The brushless DC motor of claim 30 wherein each of said pole shoes is generally T-shaped and comprises a first radial part of relatively narrow circumferential extent and a second radial part of relatively larger circumferential extent, the second radial parts of adjacent pole shoes being circumferentially spaced from each other by an intermediate gap, the circumferential extent of each of said intermediate gaps being small compared to the circumferential extent of each of said second radial parts.]

[40. The brushless DC motor of claim 39 wherein each of said second radial parts varies proceeding in the circumferential direction to generate a reluctance torque during operation of said brushless DC motor.]

[41. The brushless DC motor of claim 39 wherein each of said intermediate gaps has a circumferential extent corresponding to between two percent and twenty percent of the circumferential extent of each of said second radial parts.]

[42. The brushless DC motor of claim 30 wherein each of said magnetic field sensors comprises a Hall generator.]

[43. The brushless DC motor of claim 30 wherein each of said sets of stator coils comprises at least one diametrically opposed pair of stator coils.]

[44. The brushless DC motor of claim 43 wherein the stator coils in each of said diametrically opposed pairs are electrically connected together in series.]

[45. The brushless DC motor of claim 43 wherein said stator core comprises a stack of laminated plates of magnetically conductive material.]

[46. The brushless DC motor of claim 43 wherein said stator winding is a three-phase winding with each of said stator coils being a monofilar coil.]

[47. The brushless DC motor of claim 43 wherein the permanent magnets in said ring comprise circumferentially consecutive portions of a bent strip of a permanently magnetized material.]

[48. The brushless DC motor of claim 43 wherein said permanent magnetic material comprises a material selected from the group consisting of: magnetic material in a synthetic binder, a mixture of hard ferrite and an elastomeric material, ceramic magnetic material, and a compound containing samarium and cobalt.]

[49. The brushless DC motor of claim 43 wherein the magnetic pole in each of said permanent magnets has a circumferential extent corresponding to at least 67 percent and at most 100 percent of the circumferential extent of the corresponding permanent magnet.]

[50. The brushless DC motor of claim 43 wherein said stator core has an axial length L and said cylindrical air gap has a diameter D, wherein L is at most equal to D.]

[51. The brushless DC motor of claim 43 wherein said rotor comprises an external rotor and wherein said stator core has an external diameter E and includes a central axis circular cavity having an internal diameter of I, wherein I is at least equal to 35 percent of E.]

[52. The brushless DC motor of claim 51 wherein I is equal to between 40 and 70 percent of E.]

[53. The brushless DC motor of claim 39 wherein said stator core further comprises flux guide structures which extend out in axial direction from both axial end of the second radial parts of said pole shoes.]

[54. The brushless DC motor of claim 53 wherein the circumferential extents of said flux guide structures substantially correspond to the circumferential extents of the second radial parts of said pole shoes.]

[55. The brushless DC motor of claim 53 wherein the axial extension of said flux guide structures substantially corresponds to that of the coil ends of said stator coils.]

*56. A brushless DC motor having a total number of phases divisible by three in combination with a load member, the combination comprising:*

*a stator including a generally ring-shaped stator core having at least six radially extending pole shoes generally uniformly distributed about a central axis wherein a stator slot is defined between each pole shoe, said stator further including a stator winding having a number of physically non-overlapping stator coils disposed on said pole shoes in at least three evenly radially distributed sets wherein one non-overlapping stator coil is wound around each of said pole shoes:*

*a rotor having a circular cylindrical surface upon which a continuous ring of generally radially oriented permanent magnetic material is mounted, said ring being magnetized to form at least four radially magnetized permanent magnets of alternating polarity wherein a circular cylindrical air gap is defined between adjacent surfaces of said pole shoes and said ring of permanent magnets, a pole gap is defined between the magnetic poles in each of said permanent magnets such that the circumferential extent of each pole gap is small compared to the circumferential extent of the magnetic poles in the pair of permanent magnets adjacent thereto, the radial magnetization of said permanent magnets varies in a substantially trapezoidal manner in a circumferential direction, and the number of said stator coils divided by the number of said permanent magnets is equal to 3/2;*

*a load member other than a rigid magnetic storage disk, said load member being operatively engaged with said rotor; and*

*a control circuit electrically connected to said stator winding and mounted stationary with respect to said stator, said sets of stator coils being selectively energized by said control circuit to operatively interact with said permanent magnets, rotate said rotor about said central axis and move said load member, all of the coils in each of said sets of stator coils when energized being energized substantially simultaneously with substantially identical magnetic polarity.*

*57. The brushless DC motor of claim 56 wherein said stator core comprises a stack of laminated plates of magnetically conductive material.*

*58. The brushless DC motor of claim 56 wherein said stator winding is a three-phase winding with each of said stator coils being a monofilar coil.*

*59. The brushless DC motor of claim 56 wherein the permanent magnets in said ring comprise circumferentially consecutive portions of a bent strip of a permanently magnetized material.*

*60. The brushless DC motor of claim 56 wherein said permanent magnetic material comprises a material selected from the group consisting of: magnetic material in a synthetic binder, a mixture of hard ferrite and an elastomeric material, ceramic magnetic material, and a compound containing samarium and cobalt.*

*61. The brushless DC motor of claim 56 wherein the magnetic pole in each of said permanent magnets has a circumferential extent corresponding to at least 67 percent and at most 100 percent of the circumferential extent of the corresponding permanent magnet.*

*62. The brushless DC motor of claim 56 wherein said stator core has an axial length L and said cylindrical air gap has a diameter D, wherein L is at most equal to D.*

*63. The brushless DC motor of claim 56 wherein said rotor comprises an external rotor and wherein said stator core has an external diameter E and includes a central axis circular cavity having an internal diameter of I, wherein I is at least equal to 35 percent of E.*

*64. The brushless DC motor of claim 63 wherein I is equal to between 40 and 70 percent of E.*

*65. The brushless DC motor of claim 56 wherein each of said pole shoes is generally T-shaped and comprises a first radial part of relatively narrow circumferential extent and a second radial part of relatively larger circumferential extent, the second radial parts of adjacent pole shoes being circumferentially spaced from each other by an intermediate gap, the circumferential extent of each of said intermediate gaps being small compared to the circumferential extent of each of said second radial parts.*

*66. The brushless DC motor of claim 65 wherein each of said second radial parts varies proceeding in the circumferential direction to generate a reluctance torque during operation of said brushless DC motor.*

*67. The brushless DC motor of claim 65 wherein each of said intermediate gaps has a circumferential extent corresponding to between two percent and twenty percent of the circumferential extent of each of said second radial parts.*

*68. The brushless DC motor of claim 56 further comprising at least three magnetic field sensors mounted stationary with respect to said stator which are at least partially disposed within the magnetic field emitted by said ring of permanent magnets, said control circuit being electrically connected to said magnetic field sensors.*

*69. The brushless DC motor of claim 68 wherein each of said magnetic field sensors comprises a Hall generator.*

*70. The brushless DC motor of claim 56 wherein each of said sets of stator coils comprises at least one diametrically opposed pair of stator coils.*

*71. The brushless DC motor of claim 70 wherein the stator coils in each of said diametrically opposed pairs are electrically connected together in series.*

*72. The brushless DC motor of claim 70 wherein said stator core comprises a stack of laminated plates of magnetically conductive material.*

*73. The brushless DC motor of claim 70 wherein said stator winding is a three-phase winding with each of said stator coils being a monofilar coil.*

*74. The brushless DC motor of claim 70 wherein the permanent magnets in said ring comprise circumferentially consecutive portions of a bent strip of a permanently magnetized material.*

*75. The brushless DC motor of claim 70 wherein said permanent magnetic material comprises a material selected from the group consisting of: magnetic material in a synthetic binder, a mixture of hard ferrite and an elastomeric material, ceramic magnetic material, and a compound containing samarium and cobalt.*

*76. The brushless DC motor of claim 70 further comprising at least three magnetic field sensors mounted stationary with respect to said stator which are at least partially disposed within the magnetic field emitted by said ring of permanent magnets, said control circuit being electrically connected to said magnetic field sensors.*

*77. The brushless DC motor of claim 76 wherein each of said magnetic field sensors comprises a Hall generator.*

*78. The brushless DC motor of claim 70 wherein the magnetic pole in each of said permanent magnets has a circumferential extent corresponding to at least 67 percent and at most 100 percent of the circumferential extent of the corresponding permanent magnet.*

*79. The brushless DC motor of claim 70 wherein said stator core has an axial length L and said cylindrical air gap has a diameter D, wherein L is at most equal to D.*

*80. The brushless DC motor of claim 70 wherein said rotor comprises an external rotor and wherein said stator core has an external diameter E and includes a central axis circular cavity having an internal diameter of I, wherein I is at least equal to 35 percent of E.*

*81. The brushless DC motor of claim 80 wherein I is equal to between 40 and 70 percent of E.*

*82. The brushless DC motor of claim 65 wherein said stator core further comprises flux guide structures which extend out in axial direction from both axial ends of the second radial parts of said pole shoes.*

*83. The brushless DC motor of claim 82 wherein the circumferential extents of said flux guide structures substantially correspond to the circumferential extents of the second radial parts of said pole shoes.*

*84. The brushless DC motor of claim 82 wherein the axial extension of said flux guide structures substantially corresponds to that of the coil ends of said stator coils.*

* * * * *